United States Patent
Weston

(10) Patent No.: US 9,428,190 B2
(45) Date of Patent: Aug. 30, 2016

(54) ADAPTIVE CRUISE CONTROL WHILE TOWING

(71) Applicant: Ford Global Technologies, LLC, Dearborn, MI (US)

(72) Inventor: Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 14/581,109

(22) Filed: Dec. 23, 2014

(65) Prior Publication Data

US 2016/0176403 A1 Jun. 23, 2016

(51) Int. Cl.
| | |
|---|---|
| *B60W 30/16* | (2012.01) |
| *B60W 10/04* | (2006.01) |
| *B60W 10/10* | (2012.01) |
| *B60W 10/18* | (2012.01) |
| *B60W 10/184* | (2012.01) |
| *B60W 50/14* | (2012.01) |

(52) U.S. Cl.
CPC ............ *B60W 30/162* (2013.01); *B60W 10/04* (2013.01); *B60W 10/10* (2013.01); *B60W 10/182* (2013.01); *B60W 10/184* (2013.01); *B60W 50/14* (2013.01); *B60W 2050/146* (2013.01); *B60W 2510/184* (2013.01); *B60W 2750/308* (2013.01)

(58) Field of Classification Search
CPC ......... B60W 10/18; B60W 2550/146; B60W 2550/308; B60W 2510/184; B60W 2720/22; B60W 50/14; B60L 2240/36; B60L 2250/16; B60L 2250/10
USPC ...... 701/96, 93, 58, 68, 70, 84, 87; 477/110, 477/120; 340/449; 303/123
See application file for complete search history.

(56) References Cited

U.S. PATENT DOCUMENTS

| | | | |
|---|---|---|---|
| 8,380,390 B2* | 2/2013 | Sy .......................... | B60T 8/1708 280/400 |
| 8,493,196 B2 | 7/2013 | Pandy | |
| 2004/0015283 A1 | 1/2004 | Eckert et al. | |
| 2007/0150167 A1* | 6/2007 | Kerner ............... | B60K 31/0008 701/117 |
| 2009/0271078 A1* | 10/2009 | Dickinson ............ | G06K 9/3241 701/51 |
| 2010/0114437 A1 | 5/2010 | Boss et al. | |
| 2010/0198477 A1* | 8/2010 | Shirai ................ | B60K 31/0008 701/96 |
| 2011/0160964 A1* | 6/2011 | Obradovich ...... | G06F 17/30315 701/41 |
| 2012/0119894 A1* | 5/2012 | Pandy ................... | B60W 30/16 340/435 |
| 2013/0211689 A1* | 8/2013 | Mizutani ................ | B60K 31/00 701/96 |
| 2013/0328675 A1* | 12/2013 | Roach ..................... | B60Q 9/00 340/453 |

FOREIGN PATENT DOCUMENTS

WO 2014037065 A1 3/2014

OTHER PUBLICATIONS

Compatibility of Heavy Vehicle Combinations, printed on Sep. 26, 2014, 47 pages.
Johnson, Ruth, Michigan Commercial Driver License Manual, 2012, 169 pages.

* cited by examiner

*Primary Examiner* — Marthe Marc-Coleman
(74) *Attorney, Agent, or Firm* — Frank A. MacKenzie; Brooks Kushman P.C.

(57) ABSTRACT

A vehicle includes a powertrain, a cruise control system, and a controller. The controller, in response to a brake temperature being greater than a threshold while the cruise control system is active and the vehicle being coupled to a trailer, operates the powertrain such that a speed of the vehicle decreases to decrease the brake temperature.

19 Claims, 2 Drawing Sheets

ADAPTIVE CRUISE CONTROL WHILE TOWING

TECHNICAL FIELD

This patent application relates generally to adaptive cruise control systems for automotive vehicles.

BACKGROUND

Vehicles, including automobiles and trucks, may be provided with an adaptive cruise control system that may maintain a driver selected vehicle speed. The adaptive cruise control system may have sensors that detect the speed of a vehicle in front of the vehicle and adjust the driver selected vehicle speed to ensure a sufficient following distance.

SUMMARY

In at least one embodiment, a vehicle including a powertrain, a speed control system, and a controller is provided. The controller may be programmed to, in response to activation of the speed control system while conditions indicate the vehicle is towing an object, operate the powertrain to maintain a target following distance between the vehicle and a target vehicle based on an overall length of the vehicle and object.

In at least one embodiment, a vehicle including a powertrain, a cruise control system, and a controller is provided. The controller may be programmed to, in response to a brake temperature being greater than a threshold while the cruise control system is active and the vehicle being coupled to a trailer, operate the powertrain such that a speed of the vehicle decreases to decrease the brake temperature.

In at least one embodiment, a method of controlling a vehicle is provided. The method may include in response to activation of a vehicle speed control system and conditions indicating a presence of a towed object, prompting a user via a display interface to input a combined length of the vehicle and the towed object. The method may further include operating the vehicle to maintain a following distance between the vehicle and a forward vehicle that is based on the combined length and a brake temperature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
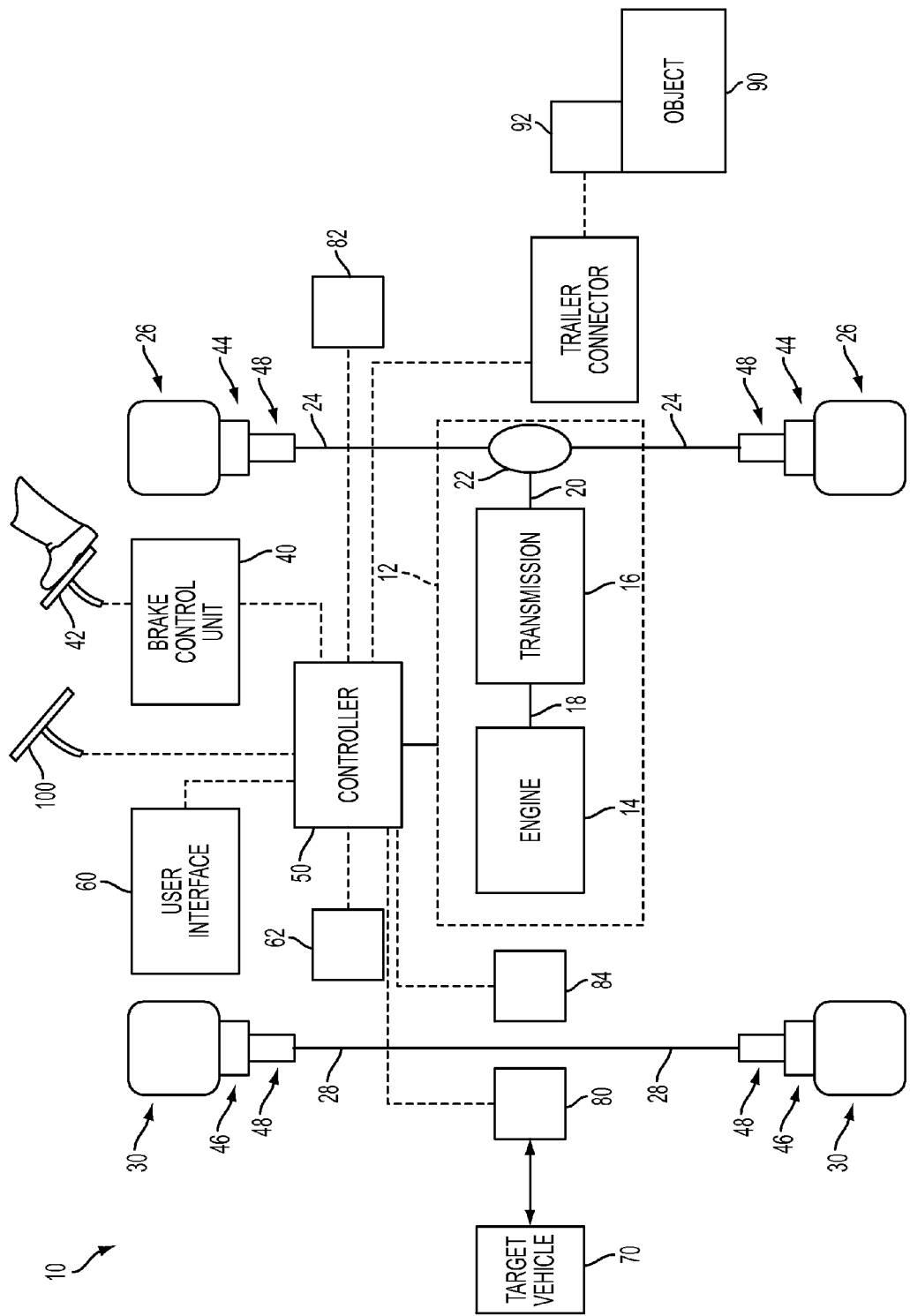
FIG. 1 is a schematic diagram of a vehicle coupled to an object.

Referring to FIG. 1, a schematic diagram of a vehicle 10 is illustrated according to an embodiment of the present disclosure. Physical placement and orientation of the components within the vehicle 10 may vary. Although the powertrain of FIG. 1 will be particularly described, the strategies in accordance with embodiments of the present disclosure may apply to other powertrain configurations. The vehicle 10 may include a powertrain 12. The powertrain 12 may include an engine 14 that is operatively connected to a transmission 16 by an input shaft 18. In some configurations, the powertrain 12 may include an electric machine selectively coupled to an engine via a disconnect clutch. The transmission 16 may include a disconnect clutch, an electric machine such as an electric motor-generator, an associated traction battery, an input shaft, a launch clutch or torque converter, and a gear box.

The transmission 16 may be configured as a step-ration transmission using multiple friction elements for transmission gear ratio changes. The transmission 16 may be configured to produce multiple forward and reverse gears via multiple gearing elements disposed within the gear box of the transmission 16.

The transmission gearbox (not shown) may be provided with a plurality of gear sets that are selectively placed in different gear ratios by the selective engagement of friction elements such as shift elements including clutches having clutch elements, and brakes (not shown). The different gear ratios provided by the gear sets may establish multiple drive ratios that may correspond to different overall transmission ratios.

An output shaft 20 may extend from the transmission 16 and may be operatively connected to a differential 22. A rear axle 24 may be operatively connected to the differential and the rear axle 24 may rotatably support a rear wheel assembly 26. The differential 22 may provide torque to the rear axle 24 and ultimately to the rear wheel assembly 26 to propel the vehicle 10.

The vehicle 10 may include a front axle 28 spaced apart from the rear axle 24. The front axle 28 may rotatbly support a front wheel assembly 30. The front axle 28 may be configured as a drive axle that may receive torque from a front differential (not shown) and provide torque to the front wheel assembly 30 to propel the vehicle 10. In at least one embodiment, the front axle 28 may be configured as a steer axle. The steer axle may articulate the front wheel assembly 30 to turn the vehicle 10.

The vehicle 10 may be provided with a braking system. The braking system may include a brake control unit 40 in communication with a brake pedal 42, a rear brake assembly 44, a front brake assembly 46, and a temperature sensor 48. The brake control unit 40 may interpret the depression of the brake pedal 42 as a request to retard the rotary motion of either the rear wheel assembly 26 by the rear brake assembly 44 or the front wheel assembly 30 by the front brake assembly 46.

The rear brake assembly 44 may be operatively connected to the rear wheel assembly 26. The front brake assembly 46 may be operatively connected to the front wheel assembly 30. The rear brake assembly 44 and/or the front brake assembly 46 may be configured as a pair of brake pad assemblies disposed about a rotor. The actuation of the brake pad assemblies may provide a clamping force to the rotor, such that the brake pad assemblies frictionally engage the rotor. The frictional engagement of the brake pad assemblies with the rotor may retard the rotary motion of the rotor and slow the rotation of the rear wheel assembly 26 and/or the front wheel assembly 30.

In at least one embodiment, the rear brake assembly 44 and/or the front brake assembly 46 may be configured as a pair of brake shoes disposed within a brake drum. The actuation of the brake shoes may cause the brake shoes to frictionally engage a surface of the brake drum. The frictional engagement of the brake shoes with the brake drum may retard the rotary motion of the brake drum and slow the rotation of the rear wheel assembly 26 and/or the front wheel assembly 30.

The frictional engagement of the brake pad assemblies with the rotor or the brake shoes with the brake drum may generate frictional heat. The heat generated may increase the temperature of the rear brake assembly 44 and the front brake assembly 46. As the temperature of the brake assemblies increases, the coefficient of friction of the friction material of the rear brake assembly 44 and/or the front brake assembly 46 may decrease. A decrease in the coefficient of friction of the friction material may result in a decrease in braking power and a subsequent increase in braking distances experienced by the vehicle.

A temperature sensor 48 may be disposed proximate the rear brake assembly 44 and the front brake assembly 46. The temperature sensor 48 may be in communication with the brake control unit 40. The temperature sensor 48 may be configured to monitor the temperature of the rear brake assembly 44 and the front brake assembly 46.

The brake temperature may be estimated by the brake control unit 40 based on an amount of brake pedal depression in specific situations. The application of the vehicle brakes while the vehicle 10 has a downward pitch may result in greater brake temperatures than when the vehicle 10 is operating on a lesser grade. A multi-dimensional look up table may be provided as part of the brake control unit 40 to estimate the brake temperature. The estimate of brake temperature may be based on a combination of ambient temperature, material properties of the rear brake assembly 44 or the front brake assembly 46, amount of brake pedal depression or brake pedal position, and the vehicle pitch angle.

The vehicle 10 may be provided with a controller 50. The controller 50 may be in communication with the powertrain 12, the brake control unit 40, and various other vehicle components. While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping the engine 14, adjusting engine spark timing, adjusting engine braking, selecting or scheduling transmission shifts, operating the rear brake assembly 44 and the front brake assembly 46, etc.

The controller 50 may include at least one microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 50 in controlling the powertrain 12 or vehicle 10.

The controller 50 may include a cruise control module or cruise control system. The cruise control system may attempt to operate the powertrain 12 to maintain an operator specified vehicle speed input via the user interface 60. The controller 50 may receive a vehicle speed from a vehicle speed sensor 62 and may attempt to minimize any differences between the operator specified vehicle speed and the vehicle speed measured by the vehicle speed sensor.

The cruise control system may be an adaptive cruise control system of the controller 50. The adaptive cruise control system of the controller 50 may operate the powertrain 12 and other vehicle subsystems to maintain a target following distance between the vehicle 10 and a target vehicle 70. The target vehicle 70 may be another vehicle within a predetermined range forward of the vehicle 10 or within a predetermined range behind the vehicle 10.

The adaptive cruise control system of the controller 50 may adjust or correct the operator specified vehicle speed. The operator specified vehicle speed may be corrected based on at least one of the target following distance and the speed of the target vehicle 70. The adaptive cruise control system of the controller 50 may correct the operator specified vehicle speed and cause the powertrain 12 to be operated to maintain the target following distance. The adaptive cruise control system of the controller 50 may also operate the rear brake assembly 44 or the front brake assembly 46 to satisfy the adjusted operator specified vehicle speed.

The adaptive cruise control system of the controller 50 may be in communication with the vehicle speed sensor 62, a forward object sensor 80, a rear object sensor 82, and a vehicle inertial sensor 84.

The forward object sensor 80 may be configured to detect whether the target vehicle 70 is forward of the vehicle 10. The forward object sensor may monitor a forward and/or lateral distance between the vehicle 10 and the target vehicle 70. The forward object sensor 80 may be disposed within a vehicle bumper, front fascia, or other forward position on the vehicle 10. The forward object sensor 80 may be a radar, RF sensor, optical sensor, laser transmitter, and corresponding receiver, or the like.

The rear object sensor 82 may be configured to detect whether an object is rearward of the vehicle 10. The rear object sensor 82 may monitor a rearward and/or lateral distance between the vehicle 10 and an object. In at least one embodiment, the rear object sensor 82 may be configured to monitor whether the vehicle 10 is coupled to or towing an object 90. The rear object sensor 82 may be disposed within a vehicle rear bumper, tailgate, trunk, or other rearward position on the vehicle 10. The rear object sensor 82 may be a radar, RF sensor, optical sensor, or laser transmitter, and a corresponding receiver, rear view camera, or the like.

In situations in which the vehicle 10 is coupled to a trailer or towing an object 90, the adaptive cruise control system of the controller 50 may estimate a target following distance between the vehicle 10 and the target vehicle 70. The target following distance may be calculated such that it complies with government following distance requirements for vehicle's towing an object. The adaptive cruise control system of the controller 50 may employ a following distance algorithm based on the vehicle speed, the speed of the target vehicle 70, and a total length of the vehicle 10 and the towed object 90.

The adaptive cruise control system of the controller 50 may operate the powertrain 12 and/or the braking system, for example, to maintain at least one second of following distance for each 10 ft of total vehicle length for vehicle speeds less than 40 mph. The adaptive cruise control system of the controller 50 may operate the powertrain 12 and/or the braking system to maintain one second plus at least one second of following distance for each 10 ft of total vehicle length for vehicle speeds greater than 40 mph. Other scenarios are also possible.

The controller 50 may be configured to determine if conditions indicate that the vehicle 10 is towing an object 90 in a variety ways. A direct method may include the operator activating a tow switch or haul switch, or initiating a tow/haul mode via the user interface 60.

The controller 50 may be in communication with a rear object sensor 82. The rear object sensor 82 may be configured to detect whether a towed object 90 is within a predetermined range aft of the vehicle 10 or coupled to the vehicle 10.

The controller 50 may be in communication with a trailer electrical connector 92 disposed on the vehicle 10. The trailer electrical connector 92 may be configured to couple an object electrical connector 94 with the vehicle 10. The electrical coupling between the vehicle 10 and the towed object 90 may indicate that the vehicle is towing an object.

The controller 50 may be in communication with an accelerator pedal 100. The controller 50 may be configured to receive an accelerator pedal position from the accelerator pedal 100 and interpret the accelerator pedal position as a powertrain command. The powertrain 12 may subsequently be operated in an attempt to satisfy the powertrain command. The powertrain command may include a request for engine torque or transmission torque. The controller 50 may correlate the request for engine torque to an engine throttle position that may assist in the powertrain 12 satisfying the powertrain command.

The controller 50 may be further programmed to determine the total amount of time required for the powertrain 12 to satisfy the powertrain command. The controller 50 may compare the total (elapsed) amount of time to an expected amount of time or expected time period within which the powertrain 12 may satisfy the powertrain command. Should the total amount of time required to satisfy the powertrain command be less than or equal to the expected amount of time to satisfy the powertrain command, the controller 50 may determine that the vehicle 10 is not towing an object. If the total amount of time required to satisfy the powertrain command is greater than the expected amount of time to satisfy the powertrain command, the controller 50 may determine that the vehicle 10 is towing an object 90.

The controller 50 may be in communication with the brake control unit 40. The brake control unit 40 may be configured to receive a brake pedal position and programmed to interpret the brake pedal position as a command to operate the rear brake assembly 44 and the front brake assembly 46. In general, the greater the brake pedal position, the greater the greater stopping force applied to the vehicle wheel assemblies. If the vehicle 10 is towing an object 90, a greater stopping force may be required to slow the rotation of the rear and front wheel assemblies, 26, 30 due to the towed object 90. Upon the controller 50 determining a brake pedal position greater than a threshold brake pedal position and a vehicle deceleration less than a threshold deceleration amount, the controller 50 may determine that the vehicle 10 is towing an object 90.

The controller 50 may be in communication with a restraint control module or electronic stability control module that may contain vehicle inertial sensors 84. The vehicle inertial sensors 84 may be configured to measure the vehicle's inertial response as the vehicle 10 is operated. The vehicle inertial sensors 84 may include a yaw sensor configured to measure a vehicle turn rate or yaw-rate, an accelerometer configured to measure side-to-side acceleration or fore-aft acceleration/deceleration, a pitch sensor configured to measure a vehicle pitch angle or attitude, a roll sensor configured to measure a vehicle roll angle, and a vehicle load sensor configured to measure a vehicle load. In response to a vehicle inertial response greater than a threshold, measured by the vehicle inertial sensors 84, the controller 50 may determine if the vehicle 10 is towing an object 90.

In response to conditions indicating that the vehicle 10 is towing an object 90, controller 50 may output for display, via the user interface 60, a prompt. The prompt may request a vehicle operator to input an overall length of the vehicle 10. The overall length of the vehicle 10 may include a length of the vehicle 10 and a length of the towed object 90. In at least one embodiment, the length of the vehicle 10 may be known and the prompt may request the operator to input a length of the towed object 90.

The controller 50 may prompt the user to input a desired vehicle speed via the user interface 60 in response to the operator activating the adaptive cruise control system of the controller 50. The powertrain 12 may be operated to satisfy the desired vehicle speed. In response to the forward object sensor 80 detecting a target vehicle 70 forward of the vehicle 10, the adaptive cruise control system of the controller 50 may calculate a target following distance. The target following distance may be based on the desired vehicle speed, the target vehicle speed, and the total length of the vehicle 10 including the towed object 90.

The powertrain 12, the rear brake assembly 44, and/or the front brake assembly 46 may be operated to maintain the target following distance between the vehicle 10 and the target vehicle 70. The controller 50 and/or the adaptive cruise control system of the controller 50 may monitor the rear brake temperature and the front brake temperature as the adaptive cruise control system of the controller 50 is active.

As the adaptive cruise control system of the controller 50 is active, the rear brake assembly 44 and/or the front brake assembly 46 may be operated to reduce vehicle speed to maintain the target following distance. The towed object 90 may require that a greater braking force be applied by the rear brake assembly 44 and/or the front brake assembly 46 to reduce the vehicle speed. The greater braking force may increase temperature of the rear brake assembly 44 and/or the front brake assembly 46 above a threshold brake temperature.

In response to the brake temperature being greater than the threshold brake temperature, a vehicle brake temperature warning may be output for display via the user interface 60. The adaptive cruise control system of the controller 50 may also be deactivated and an adaptive cruise control system of the controller 50 warning may be output for display via the user interface 60.

The vehicle brake temperature warning may request the operator of the vehicle 10 to reduce the rear brake assembly 44 and/or the front brake assembly 46 temperatures. In at least one embodiment, the controller 50 may be programmed to, in response to the brake temperature being greater than a threshold brake temperature, operate the powertrain 12 such that the brake temperature decreases and/or the vehicle speed decreases.

The controller 50 may employ various strategies to reduce the vehicle speed without applying the vehicle brakes. The strategies may include 1) engine braking to close or restrict an engine throttle to create a partial vacuum to reduce the vehicle speed, 2) compression-release braking to actuate an engine exhaust valve to release compressed air within an engine cylinder at the top of the compression stroke, 3) transmission braking or retarding, if the vehicle 10 is so equipped, to retard rotation of the input shaft 18 or the output shaft 20 of the transmission 16, 4) engine spark retarding to reduce engine speed, or 5) exhaust braking, if the vehicle 10 is so equipped, to apply a restriction within the vehicle exhaust system to increase the exhaust back-pressure.

Figure 2:
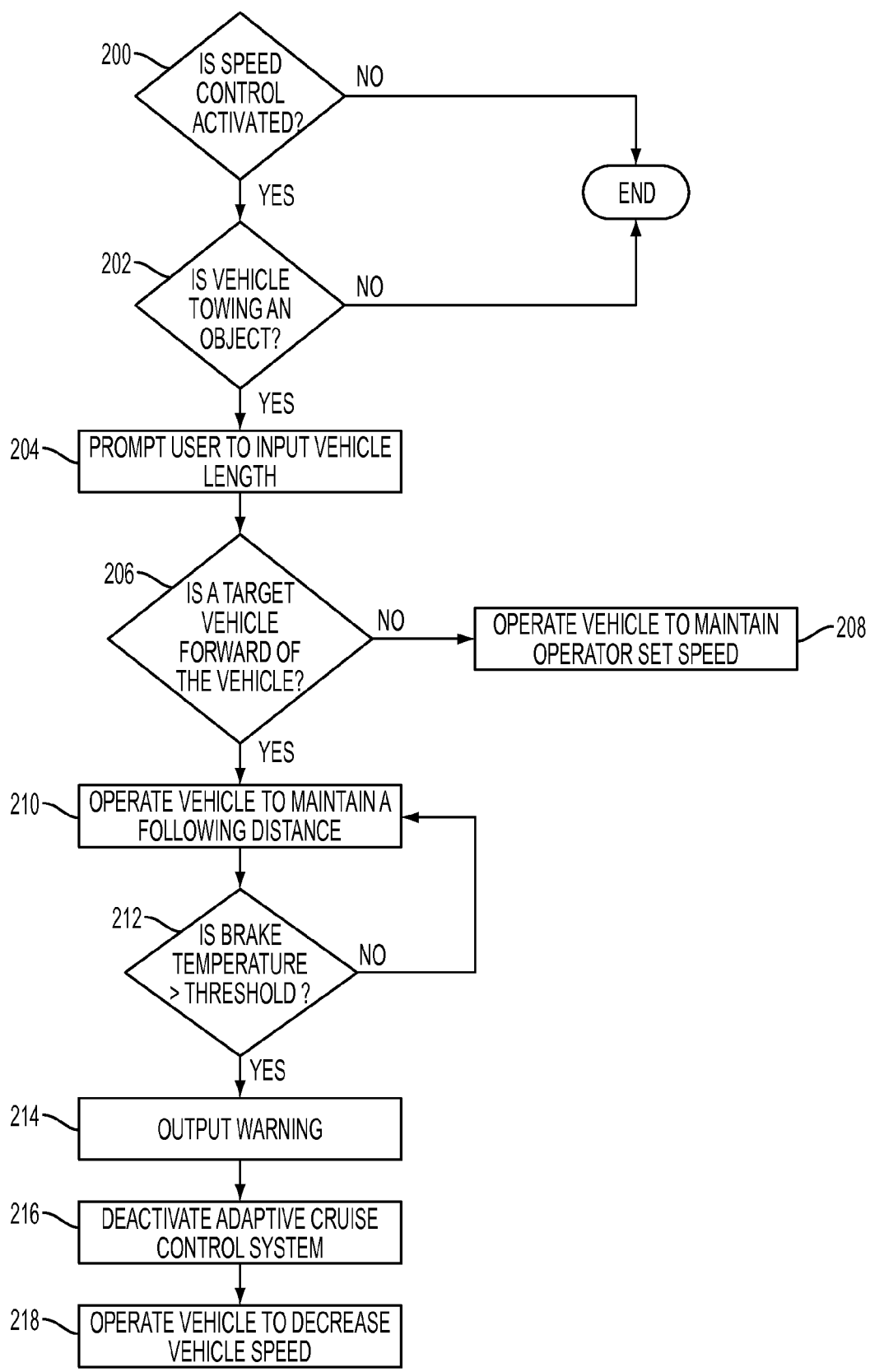
FIG. 2 is a flowchart of an exemplary method of controlling a vehicle.

Referring to FIG. 2, a flowchart of an exemplary method of controlling a vehicle is shown. As will be appreciated by one of ordinary skill in the art, the flowchart represents control logic which may be implemented in hardware, software, or a combination of hardware and software. For example, the various functions may be implemented by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the controller 50 and may be implemented as a closed loop control system. For brevity, the method will be described in the context of a single method iteration below. In addition, the method will be described below with respect to controlling first and second axle assemblies, but it is to be understood that additional axle assemblies may be controlled with the method.

At block 200, the method may assess whether the adaptive cruise control system is activated. For example, if the adaptive cruise control system is not active and/or the adaptive cruise control system is not functional the method may end. Should the adaptive cruise control system be active, the method may continue to block 202.

At block 202, the method may assess whether conditions indicate the presence of a towed object 90. The towed object 90 may be a trailer coupled to the vehicle 10. If conditions do not indicate that the vehicle 10 is towing an object 90, the method may end. Should conditions indicate that the vehicle 10 is towing an object 90, the method may continue to block 204.

At block 204, the method may prompt a user via the user interface 60 to input a combined length of the vehicle 10 and the towed object 90. In at least one embodiment, the length of the vehicle 10 may be known and the method may prompt the user to input a length of the towed object 90 alone.

At block 206, the method may assess whether a target vehicle is forward of the vehicle 10. If the forward object sensor 80 does not detect the target vehicle 70 within a predetermined range, the method may continue to block 208. At block 208, the method may operate the vehicle 10 to maintain an operator set vehicle speed. Should the forward object sensor detect a target vehicle 70 within the predetermined range, the method may continue to block 210.

At block 210, the method may operate the vehicle to maintain a following distance between the vehicle 10 and the target vehicle 70. The following distance may be based on the combined length of the vehicle 10 and the towed object 90, a desired vehicle speed, an actual vehicle speed, or a brake temperature.

At block 212, the method may assess whether the brake temperature of either the rear brake assembly 44 and/or the front brake assembly 46 is greater than a threshold brake temperature. If the brake temperature of both the rear brake assembly 44 and the front brake assembly 46 are less than the threshold brake temperature, the method may return to block 210. At block 210 the method may continue to operate the vehicle 10 to maintain the following distance between the vehicle 10 and the target vehicle 70. Should the brake temperature of either the rear brake assembly 44 or the front brake assembly 46 be greater than the threshold brake temperature, the method may continue to block 214.

At block 214, the method may output for display a warning indicative of a brake temperature greater than the threshold brake temperature. At block 216, the method may deactivate the adaptive cruise control system and output a warning indicative of the deactivation of the adaptive cruise control system.

At block 218, the method may operate the vehicle to decrease the vehicle speed without applying the rear brake assembly 44 or the front brake assembly 46 at least until the brake temperature is less than the threshold brake temperature. The method may limit a powertrain command such that an accelerator pedal input is limited. The limited powertrain command may also reduce fuel delivery to the engine 14 or an engine cylinder.

In at least one embodiment, a vehicle emergency brake may be applied to decrease the vehicle speed. In another illustrative embodiment, the method may command a transmission downshift to a lower gear or transmission ratio to decrease the vehicle speed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a powertrain;
   a speed control system; and
   a controller programmed to, in response to activation of the speed control system while conditions indicate the vehicle is towing an object, operate the powertrain to maintain a target following distance between the vehicle and a target vehicle based on an overall length of the vehicle and object.

2. The vehicle of claim 1 wherein the controller is further programmed to, in response to a brake temperature being greater than a threshold, deactivate the speed control system and output for display a vehicle brake temperature warning.

3. The vehicle of claim 2 wherein the brake temperature is derived from an ambient temperature and a vehicle pitch angle.

4. The vehicle of claim 2 wherein the brake temperature is provided by a temperature sensor disposed proximate a brake assembly.

5. The vehicle of claim 1 wherein the controller is further programmed to, in response to a presence of the conditions, prompt a user via a user interface to input a length of the object.

6. The vehicle of claim 5 wherein the conditions include at least one of an activation of a tow switch, an object electrical connector being coupled to a trailer electrical connector, and a rear object sensor detecting an object within a predetermined range aft of the vehicle.

7. The vehicle of claim 1 wherein the controller is further programmed to, in response to the powertrain satisfying a powertrain command not within an expected time period, prompt a user via a user interface to input a length of the vehicle.

8. A vehicle comprising:
a powertrain;
a cruise control system; and
a controller programmed to, in response to a brake temperature being greater than a threshold while the cruise control system is active and the vehicle being coupled to a trailer, operate the powertrain to maintain a target following distance between the vehicle and a target vehicle based on an overall length of the vehicle and object such that a speed of the vehicle decreases to decrease the brake temperature.

9. The vehicle of claim 8 wherein the controller is further programmed to, in response to the brake temperature being greater than the threshold while the cruise control system is active and the vehicle is coupled to a trailer, deactivate the cruise control system and output for display a cruise control warning.

10. The vehicle of claim 8 wherein the controller is further programmed to, in response to a total amount of time to satisfy a powertrain command exceeding a threshold, output for display a request for a user to input a total vehicle length.

11. The vehicle of claim 8 wherein the controller is further programmed to, in response to a brake pedal depression greater than a threshold brake pedal position and a vehicle deceleration less than a threshold deceleration, output for display a request for a user to input a total vehicle length.

12. The vehicle of claim 8 wherein the controller is further programmed to, in response to a vehicle inertial response greater than a threshold, output for display a request for a user to input a total vehicle length.

13. A method of controlling a vehicle comprising:
in response to activation of a vehicle speed control system and conditions indicating a presence of a towed object, prompting a user via a display interface to input a combined length of the vehicle and the towed object; and
operating the vehicle to maintain a following distance between the vehicle and a forward vehicle that is based on the combined length and a brake temperature.

14. The method of claim 13 further comprising, in response to the brake temperature being greater than a threshold, outputting for display a warning indicative of the brake temperature.

15. The method of claim 13 further comprising, in response to the brake temperature being greater than a threshold, operating the vehicle to decrease a vehicle speed.

16. The method of claim 15 wherein operating the vehicle to decrease the vehicle speed includes retarding an output shaft at least until the brake temperature is less than the threshold.

17. The method of claim 15 wherein operating the vehicle to decrease the vehicle speed includes applying a vehicle emergency brake.

18. The method of claim 15 wherein operating the vehicle to decrease the vehicle speed includes braking an engine at least until the brake temperature is less than the threshold.

19. The method of claim 15 wherein operating the vehicle to decrease the vehicle speed includes limiting a powertrain command at least until the brake temperature is less than the threshold.

* * * * *